US008625896B2

(12) United States Patent
Yang et al.

(10) Patent No.: US 8,625,896 B2
(45) Date of Patent: Jan. 7, 2014

(54) IMAGE MATTING

(75) Inventors: Qingxiong Yang, Urbana, IL (US);
Irwin E. Sobel, Menlo Park, CA (US);
Kar-Han Tan, Santa Clara, CA (US)

(73) Assignee: Hewlett-Packard Development Comapany, L.P., Houston, TX (US)

( * ) Notice: Subject to any disclaimer, the term of this patent is extended or adjusted under 35 U.S.C. 154(b) by 1276 days.

(21) Appl. No.: 12/418,538

(22) Filed: Apr. 3, 2009

(65) Prior Publication Data
US 2010/0254598 A1 Oct. 7, 2010

(51) Int. Cl.
*G06K 9/34* (2006.01)

(52) U.S. Cl.
USPC ........... 382/173; 382/164; 382/165; 382/260; 348/159; 348/586

(58) Field of Classification Search
USPC ......... 382/173, 224, 130, 190, 260, 284, 300; 348/584, 586, 159, 275, 589, 597, 590, 348/578, 722; 345/630, 640, 592, 431, 433, 345/435
See application file for complete search history.

(56) References Cited

U.S. PATENT DOCUMENTS

| | | | | |
|---|---|---|---|---|
| 6,208,351 B1 * | 3/2001 | Borg et al. | .................... | 345/600 |
| 6,480,624 B1 * | 11/2002 | Horie et al. | .................... | 382/165 |
| 7,420,590 B2 * | 9/2008 | Matusik et al. | ............... | 348/159 |
| 7,599,555 B2 * | 10/2009 | McGuire et al. | ............. | 382/173 |
| 7,602,990 B2 * | 10/2009 | Matusik et al. | ............... | 382/260 |
| 7,633,511 B2 * | 12/2009 | Shum et al. | .................... | 345/628 |
| 7,636,128 B2 * | 12/2009 | Sun et al. | ...................... | 348/586 |
| 2007/0070226 A1 | 3/2007 | Matusik | | |
| 2007/0247553 A1 | 10/2007 | Matusik | | |

OTHER PUBLICATIONS

Yung-Yu Chuang et al., A Bayesian Approach to Digital Matting. In Proceedings of IEEE Computer Vision and Pattern Recognition (CVPR 2001), vol. II, 264-271, Dec. 2001.*
Y. Chuang, B. Curless, D. Salesin, and R. Szeliski. A Bayesian approach to digital matting. In CVPR, 2001.
J. Sun, J. Jia, C.-K. Tang, and H.-Y. Shum. Poisson matting. ACM Trans. Graph., 23(3):315-321, 2004.
Alvy Ray Smith et al., "Blue Screen Matting," International Conference on Computer Graphics and Interactive Techniques, pp. 259-268, (1996).
Paul Debevec et al., "A Lighting Reproduction Approach to Live-Action Compositing," SIGGRAPH 2002, San Antonio, Jul. 21-26, 2002.
Olivier Juan et al., "Trimap Segmentation for Fast and User-Friendly Alpha Matting," Lecture Notes in Computer Science, No. 3752, Springer-Verlag, pp. 186-197 (2005).
Richard J. Qian et al., "Video Background Replacement without A Blue Screen," Image Processing, 1999. ICIP 99. Proceedings. 1999 International Conference on, vol. 4, Issue , 1999 pp. 143-144.

* cited by examiner

*Primary Examiner* — Mekonen Bekele

(57) ABSTRACT

An alpha matte is generated from image forming elements of an image. For each of one or more of the image forming elements: a respective representative foreground value is determined from one or more of the image forming element values; the respective representative foreground value and the value of the image forming element are normalized with respect to a threshold level; and a respective value of the alpha matte is generated from an evaluation of the normalized image forming element value in relation to the normalized representative foreground value.

21 Claims, 4 Drawing Sheets

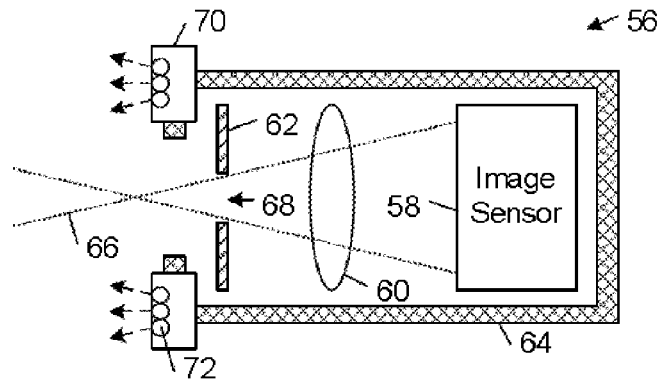
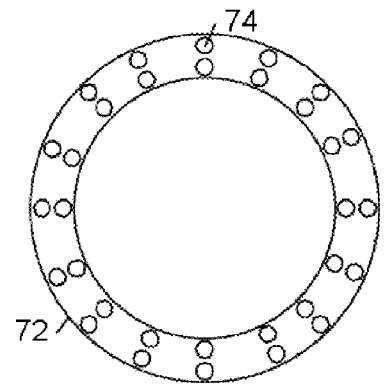
FIG. 5A           FIG. 5B
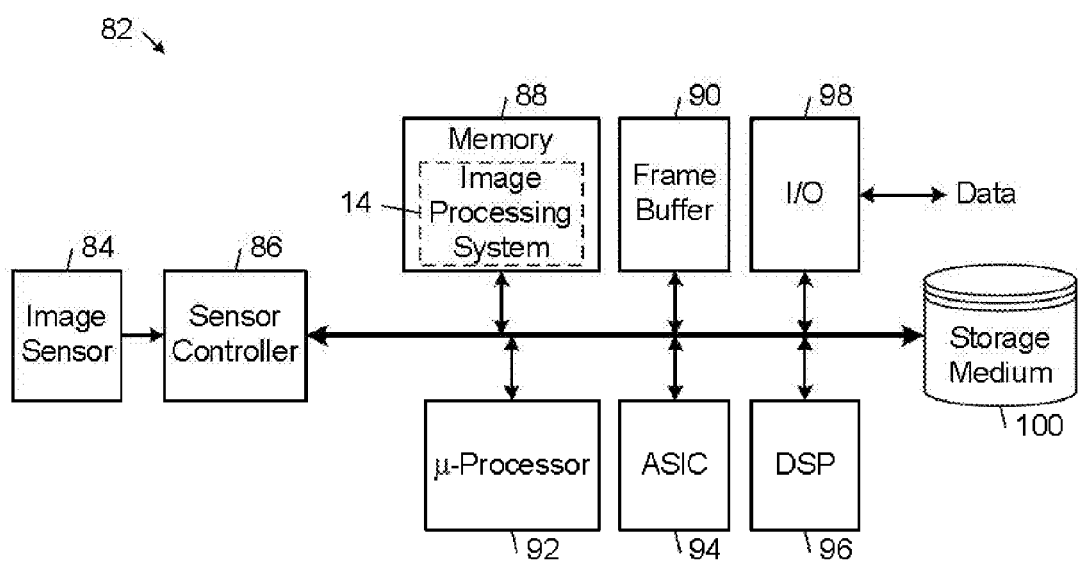
FIG. 6

IMAGE MATTING

BACKGROUND OF THE INVENTION

Matting is used in computer graphics and computer vision for a variety of purposes, including special effects in television shows and movies. Matting involves separating background and foreground regions in an image (e.g., a still image or a video image). Typically, this process is based on a model of an image I as a mixture of a foreground F and a background B in accordance with the following equation:

$$I(x)=\alpha(x)F(x)+(1-\alpha(x))B(x) \quad (1)$$

where x is a pixel location and $\alpha \in [0, 1]$ is an alpha mask that quantifies the mixture. Matting involves solving for F, B, and α based on I. A common method of extracting alpha mattes from a video involves placing the foreground objects in front of uniformly colored background screens, e.g., blue or green backgrounds. Among the problems with such an approach are the constraints that the foreground object should not include any of the background colors and care should be taken to avoid adding a colorcast of the background onto the foreground.

What are needed are improved systems and methods of generating an alpha matte that does not involve the use of colored backgrounds.

BRIEF SUMMARY OF THE INVENTION

In one aspect, the invention features a method of generating an alpha matte from image forming elements of an image. For each of one or more of the image forming elements: a respective representative foreground value is determined from one or more of the image forming element values; the respective representative foreground value and the value of the image forming element are normalized with respect to a threshold level; and a respective value of the alpha matte is generated from an evaluation of the normalized image forming element value in relation to the normalized representative foreground value.

The invention also features apparatus operable to implement the inventive methods described above and computer-readable media storing computer-readable instructions causing a computer to implement the inventive methods described above.

Other features and advantages of the invention will become apparent from the following description, including the drawings and the claims.

BRIEF DESCRIPTION OF THE DRAWINGS

FIG. 5A is a sectional view of an embodiment of a camera that includes a ring light.

FIG. 5B is a front view of an embodiment of the ring light shown in FIG. 5A.

FIG. 6 is block diagram of an embodiment of a camera that incorporates an embodiment of the image matting system of FIG. 1.

DETAILED DESCRIPTION OF THE INVENTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

I. Definition of Terms

The term "image forming element" refers to an addressable region of an image. In some embodiments, the image forming elements correspond to pixels, which are the smallest addressable units of an image. Each image forming element has at least one respective value that is represented by one or more bits. For example, an image forming element in the RGB color space includes a respective value for each of the colors red, green, and blue, where each of the values may be represented by one or more bits.

A "mixed image forming element" is an image forming element that is classified as having contributions from a foreground object and a background.

A "computer" is a machine that processes data according to machine-readable instructions (e.g., software) that are stored on a machine-readable medium either temporarily or permanently. A set of such instructions that performs a particular task is referred to as a program or software program.

The term "machine-readable medium" refers to any medium capable carrying information that is readable by a machine (e.g., a computer). Storage devices suitable for tangibly embodying these instructions and data include, but are not limited to, all forms of non-volatile computer-readable memory, including, for example, semiconductor memory devices, such as EPROM, EEPROM, and Flash memory devices, magnetic disks such as internal hard disks and removable hard disks, magneto-optical disks, DVD-ROM/RAM, and CD-ROM/RAM.

As used herein, the term "includes" means includes but not limited to, the term "including" means including but not limited to. The term "based on" means based at least in part on.

II. Introduction

The embodiments that are described herein provide reliable, robust extraction of alpha mattes and foreground objects from images (e.g., still images and video images) without requiring the use of a colored background. In these embodiments, an alpha matte is generated based on evaluations of normalized image forming element values in relation to a normalized representative foreground value, where the image forming element values and the representative foreground value are normalized with respect to a specified threshold level that is set to segment the foreground object from the background in mixed image forming elements. In this way, these embodiments enable alpha mattes to be quickly and effectively generated without the complexities and concomitant problems associated with colored-background based approaches. The foreground objects readily can be determined from the alpha mattes and the corresponding images.

III. Overview

Figure 1:
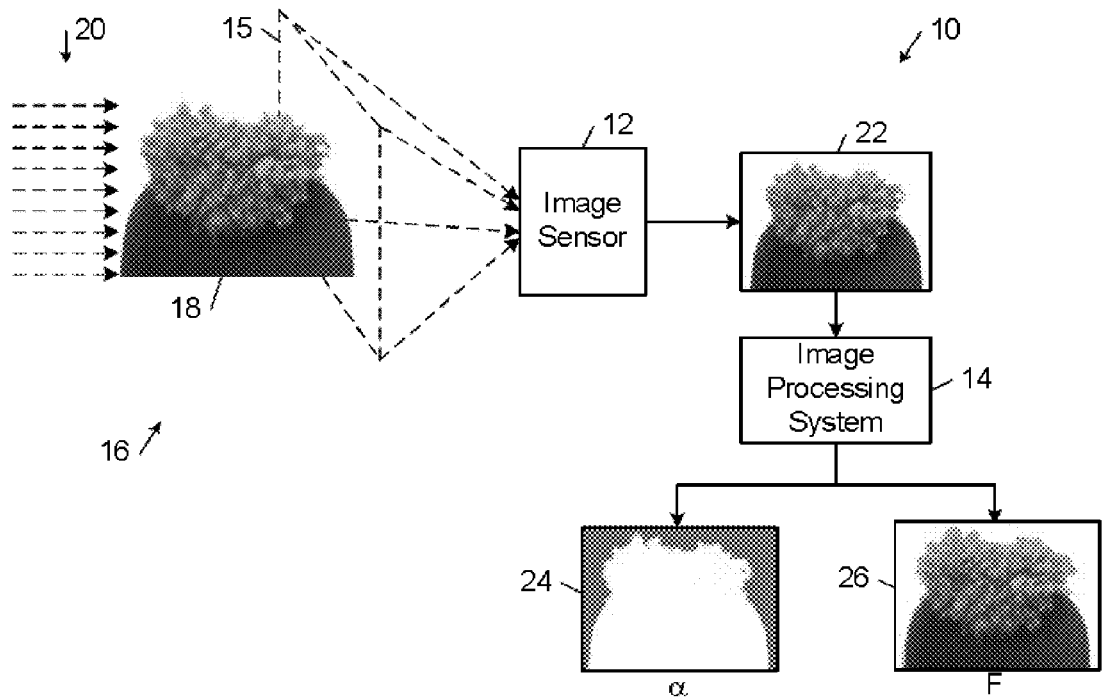
FIG. 1 is a block diagram of an embodiment of an image matting system.

FIG. 1 shows an embodiment of an image matting system 10 that includes an image sensor 12 and an image processing system 14. The image sensor 12 has a field of view 15 of a scene 16 that includes a foreground object 18 (i.e., a dog).

Light 20 illuminates a first side of the foreground object, and the image sensor 12 an image 22 from a second side of the foreground object opposite the first side. The image 22 is generated from the portion of the light 20 that is unobscured by and outlines the foreground object 18 in the scene 16, as well as from light that is reflected from the foreground object 18 and other elements of the scene 16. The image processing system 14 derives an alpha matte 24 and an image 26 of the foreground object 18 from the image 22. In FIG. 1, the gray values of the background pixels represent alpha matte values of zero.

Figure 2:
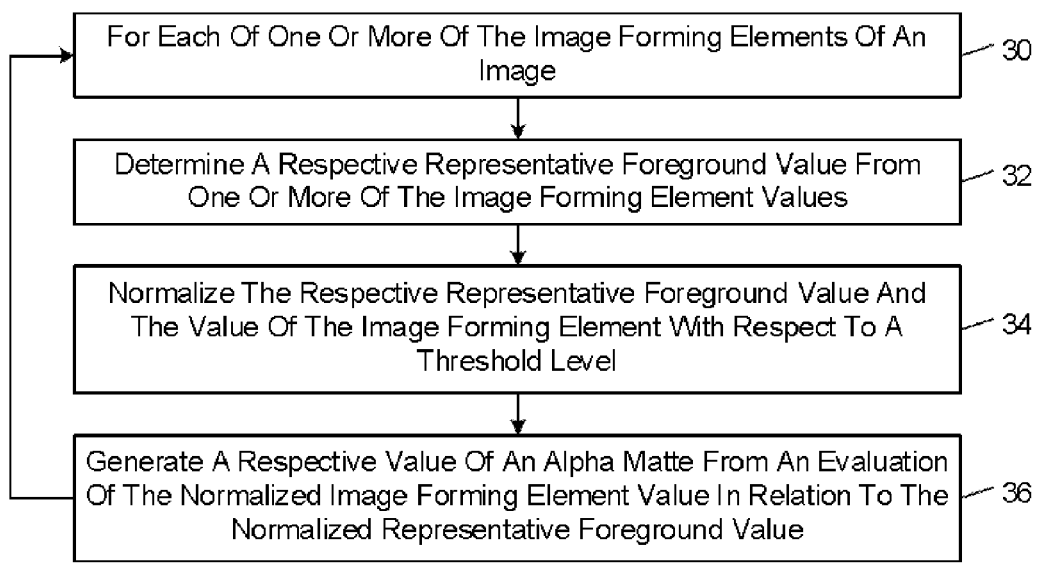
FIG. 2 is a flow diagram of an embodiment of a method of generating an alpha matte.

FIG. 2 shows an embodiment of a method by which the image matting system 14 generates the alpha matte 24 from the image 22. In accordance with this method, the following processes are performed for each of one or more of the image forming elements of the image 22 (FIG. 2, block 30). The image processing system 14 determines a respective representative foreground value from one or more of the image forming element values (FIG. 2, block 32). The image processing system 14 normalizes the respective representative foreground value and the value of the image forming element with respect to a threshold level (FIG. 2, block 34). The image processing system 14 generates a respective value of the alpha matte 24 from an evaluation of the normalized image forming element value in relation to the normalized representative foreground value (FIG. 2, block 36).

In some embodiments, the image 22 has multiple color components, and each of the image forming elements has a respective color component value for each of the color components. In these embodiments, a respective foreground color component value is determined for each of the color components. For each of the color components, the respective foreground color component value and the respective image forming element color component value are normalized. In addition, for each of the color components, a respective alpha matte value is generated from a respective evaluation of the respective normalized image forming element color component value in relation to the respective normalized foreground color component value.

The elements of the method of FIG. 2 are described detail below in the following section.

IV. Image Matting

A. Image Capture

The image sensor 12 captures the image 22 of the scene 16. This process typically involves shining the light 12 towards the foreground object 18 and capturing the light that outlines (or surrounds) the foreground object 18 in the scene 16.

In some embodiments, the threshold level that is used to normalize the representative foreground values and the image forming element values (see FIG. 2, block 34) is a saturation level of the image forming element values. In these embodiments, the image sensor 12 typically is calibrated so that the intensity of the captured light 12 saturates the ones of the image forming elements of the image sensor 12 that depict the background to a saturation level of the image forming elements. In this process, a user typically adjusts the exposure and/or gain levels of the image sensor 12 until the background image forming elements are saturated while the foreground image forming elements are not saturated. In one exemplary calibration process, the user captures one or more images of a white reference (e.g., a white board) that is is placed in front of the target background, and adjusts the exposure and/or gain levels of the image sensor until the background image forming elements appearing in the calibration images are saturated and the foreground image forming elements are not saturated. After the calibration process, the image sensor is ready to capture the image 22.

The light 12 can be sourced by one or more light sources that are located on an opposite side of the foreground object 12 as the image sensor 12 or from the same side of the foreground object as the image sensor 12.

Figure 3:
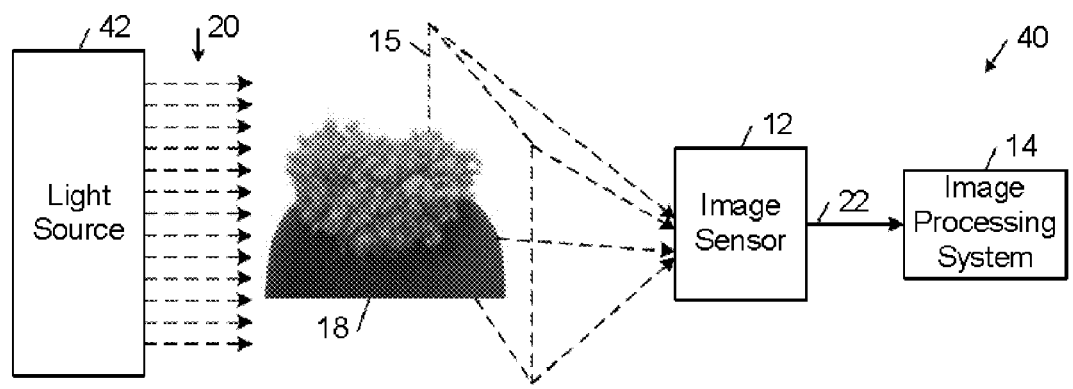
FIG. 3 is a block diagram of an embodiment of the image matting system of FIG. 1.

FIG. 3 shows an embodiment 40 of the image matting system 10 that includes a light source 42 that sources the light 12 from the opposite side of the foreground object 18 as the image sensor 12. The illuminating light that is generated by the light source 42 may be mono-colored or multi-colored. In some exemplary embodiments, the illuminating light is white, which avoids the addition of a colorcast to the foreground object 18. In general, the light source 42 may be any type of light source that generates light with sufficient intensity to saturate the image forming elements of the image sensor 12. In some embodiments, the light source 42 is implemented by one or more light emitting diodes.

Figure 4:
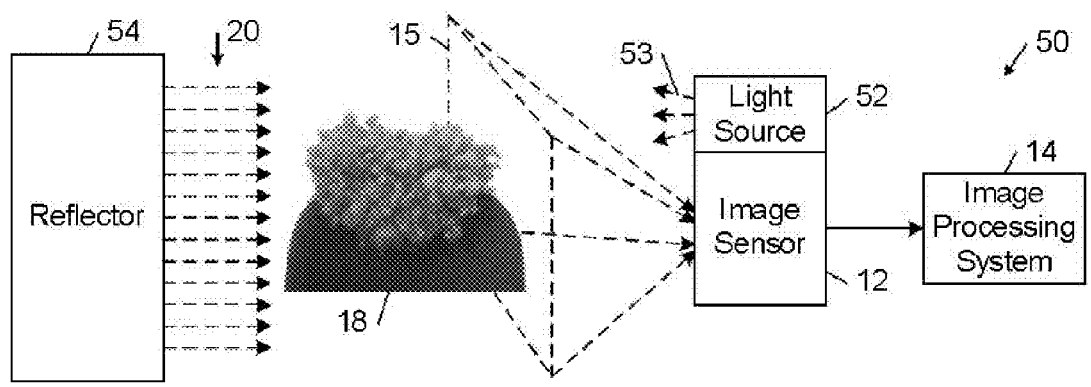
FIG. 4 is a block diagram of an embodiment of the image matting system of FIG. 1.

FIG. 4 shows another embodiment 50 of the image matting system 10 that includes a light source 52 that is located on the same side of the foreground object 18 as the image sensor 12. The illuminating light 53 that is generated by the light source 52 may be mono-colored or multi-colored. In some exemplary embodiments, the illuminating light is white, which avoids the addition of a colorcast to the foreground object 18. In general, the light source 52 may be any type of light source that generates light with sufficient intensity to saturate the image forming elements of the image sensor 12. In some embodiments, the light source 52 is implemented by one or more light emitting diodes.

The image matting system 50 additionally includes a reflector 54 that is located on the opposite side of the foreground object 18 as the image sensor 12 and the light source 52. The reflector 54 may be implemented by a wide variety of different types of reflectors that include one or more elements that reflect the light 12 with high efficiency. In some embodiments the reflector 54 is a retroreflector (e.g., a retroreflective curtain). In the embodiment of FIG. 4, some of the illuminating light 53 reflects off the illuminated side of the foreground object 18 towards the image sensor 12 and other portions of the light 53 are reflected by the reflector 54 as the light 20, which is directed towards the image sensor 12. The image sensor 12 captures the image 22 of at least a portion of the sourced light 53 that is reflected from the illuminated side of the foreground object 18, as well as a portion 20 of the sourced light 53 that is reflected from the reflector 54.

FIGS. 5A and 5B show an embodiment of a camera 56 that is suitable for use in the embodiment of FIG. 4. The camera 56 includes an embodiment 58 of the image sensor 12, an optical system 60, and a diaphragm 62 that are contained within a housing 64. The image sensor 58 typically is implemented by a two-dimensional CCD or CMOS image sensor. The optical system 60 typically is implemented by one or more lenses that focus the incoming light 66 from the field of view 15 onto the active region of the image sensor 58. The diaphragm 62 defines an aperture 68 that controls the amount of incoming light that is focused by the optical system 60. In operation, the image sensor 58 produces image optical data from the incoming light 66 that is focused by the optical system 60 onto the active region. The camera 56 additionally includes an embodiment 70 of the light source 52. The light source 70 includes a ring 72 of light emitting diodes 74 that emit white light (e.g., white light or mono-colored light).

B. Image Processing

1. Introduction

The image processing system 14 processes the captured image 12 in order to generate the alpha matte 24 and the foreground image 26 (see FIG. 1).

In some embodiments, before executing the processes described in blocks 32-36 of the method shown in FIG. 2, the image processing system 14 segments the image 22 into a trimap that segments the image forming elements of the image 22 into background, foreground, and mixed image forming elements. In this process, the image processing system 14 classifies the image forming elements of the image 22 based on their respective values. Image forming elements with values greater than or equal to a first threshold ($I_B$) are classified as background image forming elements. Image forming elements with values less than or equal to a second threshold ($I_F$) are classified as foreground image forming elements. The image forming elements with values between the first and second thresholds are classified as mixed image forming elements.

In the alpha matte, the image forming elements that correspond to background image forming elements in the image 22 are assigned a minimal value (e.g., zero, corresponding to a black color); the image forming elements that correspond to foreground image forming elements in the image 22 are assigned a maximal value (e.g., 255 in an eight-bit color space model, corresponding to white); and the image forming elements that correspond to mixed image forming elements in the image 22 are assigned a respective grayscale value in accordance with the processes described in blocks 32-36 of FIG. 2.

2. Determining a Representative Foreground Value

For each of the mixed image forming elements, the image processing system 14 determines a respective representative foreground value from one or more of the image forming element values (FIG. 2, block 32).

In some embodiments, the image processing system 14 determines the respective representative foreground value from one or more of the image forming element values corresponding to the foreground object. In some embodiments, for each mixed image forming element, the image processing system 14 sets the respective representative foreground value as the value of the nearest one of the foreground image forming elements in the image 22. In this process, the image processing system 14 determines the respective Euclidean distance between the mixed image forming element and each of the foreground image forming elements. In some embodiments, the image processing system 14 sets the respective representative foreground value to a respective one of the image forming element values corresponding to a point on a foreground object in the image. In these embodiments, the image processing system 14 selects the value of the foreground image forming element that is associated with the smallest Euclidean distance as the respective representative foreground value for that mixed image forming element. In other embodiments, the representative foreground values may be determined from a combination (e.g., average) of multiple foreground image forming element values.

3. Normalizing the Foreground Value and the Image Forming Element Values

For each of the mixed image forming elements, the image processing system 14 normalizes the respective representative foreground value and the mixed image forming element value with respect to a threshold level (FIG. 2, block 34).

In some embodiments, the normalization process involves for each of the mixed image forming elements (i) determining the normalized representative foreground value from a difference between the representative foreground value and the threshold level, and (ii) determining the normalized image forming element value from a respective difference between the respective image forming element value and the threshold level. The threshold level typically is set to a value at or below the value of the background image forming elements in the image 22. In these embodiments, the threshold level is set to the saturation value of the image forming elements (e.g., 255 in an eight-bit color space model). In other embodiments, the threshold level is set to a value below the saturation value of the image forming elements.

4. Generating the Alpha Matte

As explained above, the image forming elements in the alpha matte 24 that correspond to background image forming elements in the image 22 are assigned a minimal value (e.g., zero, corresponding to a black color), and the image forming elements in the alpha matte 24 that correspond to foreground image forming elements in the image 22 are assigned a maximal value (e.g., 255 in an eight-bit color space model, corresponding to white). The image forming elements in the alpha matte 24 that correspond to mixed image forming elements in the image 22 are assigned respective values based on the values of the corresponding mixed image forming elements in image 22, the representative foreground values, and the threshold value.

For each of the mixed image forming elements, the image processing system 14 generates a respective value of the alpha matte 24 from an evaluation of the normalized image forming element value in relation to the normalized representative foreground value (FIG. 2, block 36).

In some embodiments, the image processing system 14 determines values of the alpha matte from respective ratios between the normalized image forming element values and the normalized representative foreground values. In some of these embodiments, the image forming element values (x of the alpha matte a, are given in accordance with equation (2):

$$\alpha_p = \frac{B_p - I_p}{B_p - F_p} \quad (2)$$

where $I_p$ is the intensity of image forming element p in the image 22, $F_p$ is the respective representative foreground image forming element determined for pixel p, $B_p$ is the threshold value for pixel p. In some embodiments, $B_p$ is equal to a maximal intensity value (e.g., 255 in an eight-bit color space model, corresponding to white) for all pixels p. Here, $B_p - I_p$ is the normalized image forming element value, and $B_p - F_p$ is the normalized representative foreground value.

5. Generating the Foreground Object Image

In some embodiments, the values of the background and foreground image forming elements in the foreground object image 26 are the same as the values of the background and foreground image forming elements in the image 22. In these embodiments, the image forming elements ($F_p$) in the foreground object image 26 that correspond to mixed image forming elements in the image 22 are assigned the representative foreground values determined above.

V. Exemplary Operating Environments

A. Introduction

The image sensor 12 may be implemented by any type of imaging device that is capable of capturing one-dimensional or two-dimensional images of a scene. The image sensor 12 typically includes at least one image sensing component with a respective light sensing active area. Exemplary image sensing components include charge coupled devices (CCDs) and complementary metal-oxide-semiconductor (CMOS) devices. The image sensor 12 may include one or more optical elements for directing (e.g., shaping, focusing, or changing the propagation path of) the incoming light from the scene 16.

The image processing system 14 typically includes one or more discrete data processing components, each of which may be in the form of any one of various commercially available data processing chips. The image processing system 14 is not limited to a specific hardware or software configuration, but rather it may be implemented in any computing or processing environment, including in digital electronic circuitry or in computer hardware, firmware, device driver, or software. In some implementations, the image processing system 14 is embedded in the hardware of any one of a wide variety of digital and analog electronic devices, including desktop and workstation computers, digital still image cameras, digital video cameras, printers, scanners, and portable electronic devices (e.g., mobile phones, laptop and notebook computers, and personal digital assistants). In some embodiments, the image processing system 14 executes process instructions (e.g., machine-readable code, such as computer software) for implementing the methods that are executed by the embodiments of the image matting system 10. These process instructions, as well as the data generated in the course of their execution, are stored in one or more computer-readable media. Storage devices suitable for tangibly embodying these instructions and data include all forms of non-volatile computer-readable memory, including, for example, semiconductor memory devices, such as EPROM, EEPROM, and flash memory devices, magnetic disks such as internal hard disks and removable hard disks magneto-optical disks, DVD-ROM/RAM, and CD-ROM/RAM.

Embodiments of the image processing system 14 may be implemented by one or more discrete modules (or data processing components) that are not limited to any particular hardware, firmware, or software configuration. In some embodiments, the functionalities of the modules are combined into a single data processing component. In some embodiments, the respective functionalities of each of one or more of the modules are performed by a respective set of multiple data processing components. The various modules of the image processing system 14 may be co-located on a single apparatus or they may be distributed across multiple apparatus; if distributed across multiple apparatus, the modules may communicate with each other over local wired or wireless connections, or they may communicate over global network connections (e.g., communications over the internet).

B. A First Exemplary Image Matting System Architecture and Application Environment FIG. 6 shows an embodiment of a digital camera system 82 that incorporates an embodiment of the image processing system 14. The digital camera system 82 may be configured to capture one or both of still images and video image frames. The digital camera system 82 includes an image sensor 84 (e.g., a charge coupled device (CCD) or a complementary metal-oxide-semiconductor (CMOS) image sensor), a sensor controller 86, a memory 88, a frame buffer 90, a microprocessor 92, an ASIC (application-specific integrated circuit) 94, a DSP (digital signal processor) 96, an I/O (input/output) adapter 98, and a storage medium 100. In general, the image processing system 14 may be implemented by one or more of hardware and firmware components. In the illustrated embodiment, the image processing system 60 is implemented in firmware, which is loaded into memory 88. The storage medium 100 may be implemented by any type of image storage technology, including a compact flash memory card and a digital video tape cassette. The image data stored in the storage medium 100 may be transferred to a storage device (e.g., a hard disk drive, a floppy disk drive, a CD-ROM drive, or a non-volatile data storage device) of an external processing system (e.g., a computer or workstation) via the I/O subsystem 98.

The microprocessor 92 choreographs the operation of the digital camera system 82. The image signal produced by the image sensor 84 is passed to the image processing system 14, which produces the image 22, the alpha matte 24, and the foreground image 26 from the received data. In these embodiments, the image processing system 14 typically performs various operations on the image data, including one or more of the following operations: demosaicing; color correction; image compression; one or more storage operations; and one or more transmission operations.

Figure 7:
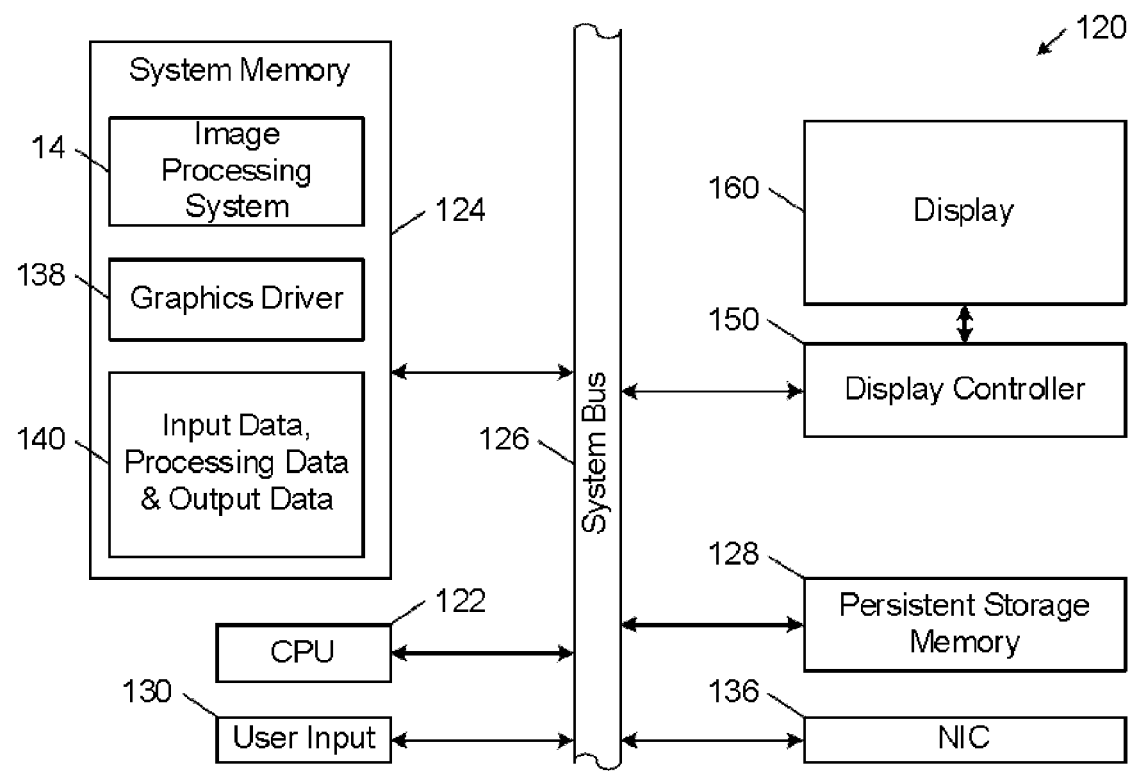
FIG. 7 is block diagram of an embodiment of a computer that incorporates an embodiment of the image matting system of FIG. 1.

C. A Second Exemplary Image Matting System Architecture and Application Environment FIG. 7 shows an embodiment of a computer system 120 that can implement any of the embodiments of the image processing system 14 that are described herein. The computer system 120 includes a processing unit 122 (CPU), a system memory 124, and a system bus 126 that couples processing unit 122 to the various components of the computer system 120. The processing unit 122 typically includes one or more processors, each of which may be in the form of any one of various commercially available processors. The system memory 124 typically includes a read only memory (ROM) that stores a basic input/output system (BIOS) that contains start-up routines for the computer system 120 and a random access memory (RAM). The system bus 126 may be a memory bus, a peripheral bus or a local bus, and may be compatible with any of a variety of bus protocols, including PCI, VESA, Microchannel, ISA, and EISA. The computer system 120 also includes a persistent storage memory 128 (e.g., a hard drive, a floppy drive, a CD ROM drive, magnetic tape drives, flash memory devices, and digital video disks) that is connected to the system bus 126 and contains one or more computer-readable media disks that provide non-volatile or persistent storage for data, data structures and computer-executable instructions.

A user may interact (e.g., enter commands or data) with the computer 120 using one or more input devices 130 (e.g., a keyboard, a computer mouse, a microphone, joystick, and touch pad). Information may be presented through a user interface that is displayed to the user on a display monitor 160, which is controlled by a display controller 150 (implemented by, e.g., a video graphics card). The computer system 120 also typically includes peripheral output devices, such as speakers and a printer. One or more remote computers may be connected to the computer system 120 through a network interface card (NIC) 136.

As shown in FIG. 7, the system memory 124 also stores the image processing system 14, a graphics driver 138, and processing information 140 that includes input data, processing data, and output data. In some embodiments, the image processing system 14 interfaces with the graphics driver 138 (e.g., via a DirectXe component of a MicrosoftWindows® operating system) to present a user interface on the display monitor 160 for managing and controlling the operation of the image processing system 10.

VI. Conclusion

The embodiments that are described herein provide reliable, robust extraction of alpha mattes and foreground objects from images (e.g., still images and video images) without requiring the use of a colored background. In these embodiments, an alpha matte is generated based on evaluations of normalized image forming element values in relation to a normalized representative foreground value, where the image forming element values and the representative foreground value are normalized with respect to a specified threshold level that is set to segment the foreground object from the background in mixed image forming elements. In this way, these embodiments enable alpha mattes to be quickly and effectively generated without the complexities and concomitant problems associated with colored-background based approaches. The foreground objects readily can be determined from the alpha mattes and the corresponding images.

Other embodiments are within the scope of the claims.

The invention claimed is:

1. A method of generating an alpha matte from an image comprising image forming elements each of which has a respective value, the method comprising operating a physical processor to perform operations comprising for each of one or more of the image forming elements:
   determining a respective representative foreground value from one or more of the image forming element values;
   normalizing the respective representative foreground value and the value of the image forming element with respect to a threshold level; and
   generating a respective value of the alpha matte from an evaluation of the normalized image forming element value in relation to the normalized representative foreground value.

2. The method of claim 1, further comprising capturing the image of a scene comprising a foreground object and a background, and the determining comprises determining the representative foreground value from one or more of the image forming element values corresponding to the foreground object.

3. The method of claim 2, further comprising shining light towards the foreground object, and wherein the capturing comprises capturing the light that outlines the foreground object in the scene, and the captured portion of the light has an intensity that saturates ones of the image forming elements depicting the background to the saturation level.

4. The method of claim 3, wherein the shining comprises sourcing the light from a first side of the foreground object, and the capturing comprises capturing the image from a second side of the foreground object opposite the first side.

5. The method of claim 3, wherein the shining comprises sourcing the light from an illumination side of the foreground object, and the capturing comprises capturing the image of the sourced light reflected from the illuminated side of the foreground object and the sourced light reflected from a reflector located on a second side of the object opposite the illumination side.

6. The method of claim 3, wherein the shined light is white light.

7. The method of claim 1, wherein the determining comprises setting the respective representative foreground value to a respective one of the image forming element values corresponding to a point on a foreground object in the image.

8. The method of claim 7, wherein the determining comprises identifying ones of the image forming elements that corresponding to the foreground object in the image, ascertaining a respective one of the identified image forming elements that is nearest to the image forming element for which the respective representative foreground value is being determined, and setting the respective representative foreground value to the value of the ascertained one of the image forming elements corresponding to the foreground object in the image.

9. The method of claim 1, wherein the normalizing comprises (i) determining the normalized representative foreground value from a difference between the representative foreground value and the threshold level, and (ii) determining the normalized image forming element value from a respective difference between the respective image forming element value and the threshold level.

10. The method of claim 1, wherein the threshold level is a saturation level of the image forming element values.

11. The method of claim 1, wherein the generating comprises determining the respective value of the alpha matte from a respective ratio between the normalized image forming element value and the normalized representative foreground value.

12. The method of claim 1, wherein:
   the image comprises multiple color components;
   each of the image forming elements has a respective color component value for each of the color components;
   the determining comprises determining a respective foreground color component value for each of the color components;
   the normalizing comprises for each of the color components normalizing the respective foreground color component value and the respective image forming element color component value; and
   the generating comprises for each of the color components generating a respective alpha matte value from a respective evaluation of the respective normalized image forming element color component value in relation to the respective normalized foreground color component value.

13. At least one non-transitory computer-readable medium having computer-readable program code embodied therein, the computer-readable program code adapted to be executed by a computer to implement a method of generating an alpha matte from an image comprising image forming elements each of which has a respective value, the method comprising:
   determining a respective representative foreground value from one or more of the image forming element values;
   normalizing the respective representative foreground value and the value of the image forming element with respect to a threshold level; and
   generating a respective value of the alpha matte from an evaluation of the normalized image forming element value in relation to the normalized representative foreground value.

14. The at least one computer-readable medium of claim 13, wherein in the determining the program code causes the computer to perform operations comprising setting the respective representative foreground value to a respective one of the image forming element values corresponding to a point on a foreground object in the image.

15. The at least one computer-readable medium of claim 13, wherein in the normalizing the program code causes the computer to perform operations comprising (i) determining the normalized representative foreground value from a difference between the representative foreground value and the threshold level, and (ii) determining the normalized image forming element value from a respective difference between the respective image forming element value and the threshold level.

16. The at least one computer-readable medium of claim 13, wherein in the generating the program code causes the computer to perform operations comprising determining the respective value of the alpha matte from a respective ratio between the normalized image forming element value and the normalized representative foreground value.

17. Apparatus for generating an alpha matte from an image comprising image forming elements each of which has a respective value, comprising:

a computer-readable memory storing computer-readable instructions; and a data processing unit coupled to the memory, operable to execute the instructions, and based at least in part on the execution of the instructions operable to perform operations comprising determining a respective representative foreground value from one or more of the image forming element values;

normalizing the respective representative foreground value and the value of the image forming element with respect to a threshold level; and generating a respective value of the alpha matte from an evaluation of the normalized image forming element value in relation to the normalized representative foreground value.

18. The apparatus of claim 17, wherein in the determining the data processing unit is operable to perform operations comprising setting the respective representative foreground value to a respective one of the image forming element values corresponding to a point on a foreground object in the image.

19. The apparatus of claim 17, wherein in the normalizing the data processing unit is operable to perform operations comprising (i) determining the normalized representative foreground value from a difference between the representative foreground value and the threshold level, and (ii) determining the normalized image forming element value from a respective difference between the respective image forming element value and the threshold level.

20. The apparatus of claim 17, wherein in the generating the data processing unit is operable to perform operations comprising determining the respective value of the alpha matte from a respective ratio between the normalized image forming element value and the normalized representative foreground value.

21. The method of claim 1, further comprising classifying ones of the image forming elements of the image as foreground image forming elements and classifying other ones of the image forming elements of the image as mixed image forming elements; and wherein for each of respective ones of the mixed image forming elements, the determining comprises setting the respective representative foreground value to a value of a respective one of the foreground image forming elements nearest the respective mixed image forming element.

* * * * *

UNITED STATES PATENT AND TRADEMARK OFFICE
CERTIFICATE OF CORRECTION

PATENT NO.        : 8,625,896 B2                                    Page 1 of 1
APPLICATION NO.   : 12/418538
DATED             : January 7, 2014
INVENTOR(S)       : Qingxiong Yang et al.

It is certified that error appears in the above-identified patent and that said Letters Patent is hereby corrected as shown below:

On the title page, in item (73), Assignee, in column 1, line 2, delete "Comapany," and insert
-- Company, --, therefor.

Signed and Sealed this
Tenth Day of June, 2014

Michelle K. Lee
*Deputy Director of the United States Patent and Trademark Office*